R. P. DE VAULT.
MOTION PICTURE APPARATUS.
APPLICATION FILED AUG. 8, 1918.
1,347,326.
Patented July 20, 1920.
3 SHEETS—SHEET 1.
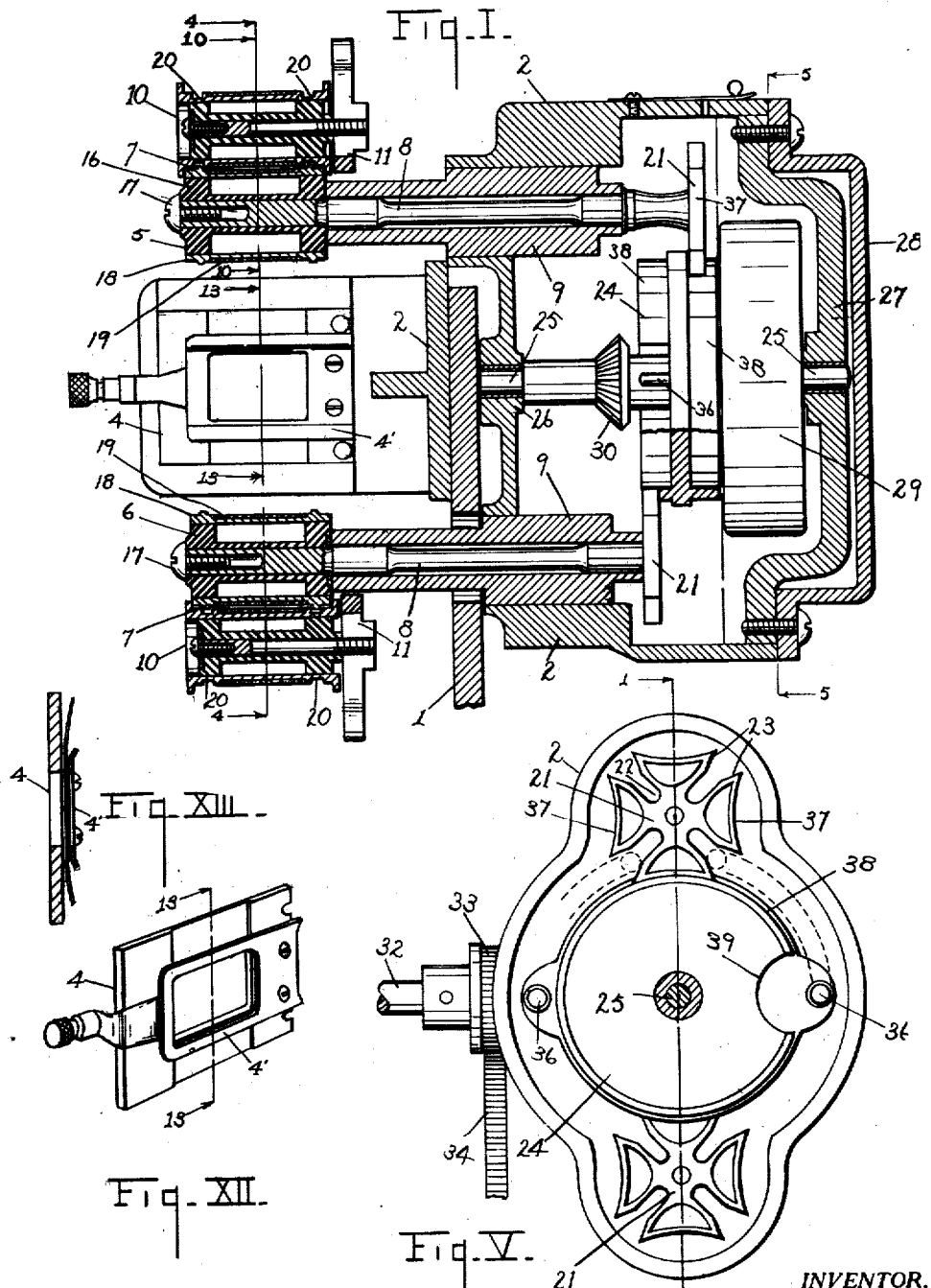
WITNESSES:
M. Louise Thurston
Lenn Gilman
INVENTOR.
RALPH P. DEVAULT
BY Chappell & Earl
ATTORNEYS.

R. P. DE VAULT.
MOTION PICTURE APPARATUS.
APPLICATION FILED AUG. 8, 1918.
1,347,326.
Patented July 20, 1920.
3 SHEETS—SHEET 2.
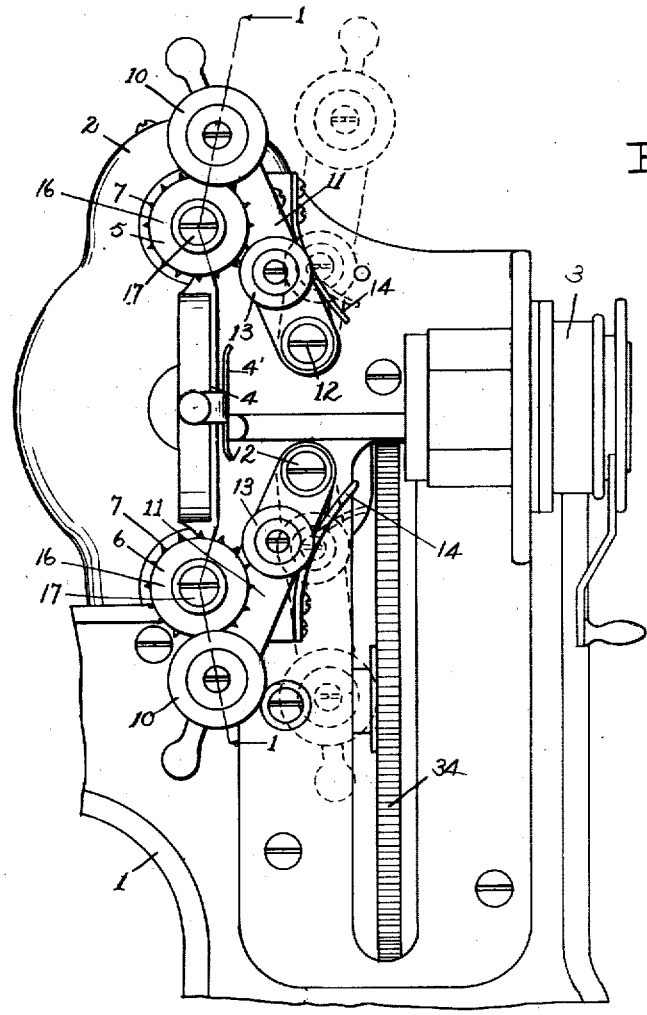
Fig. II.
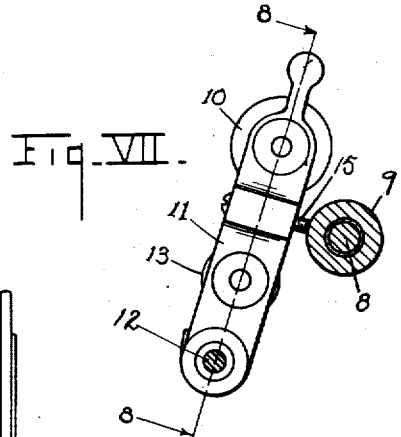
Fig. VII.
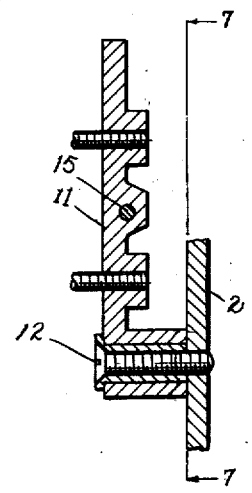
Fig. VIII.
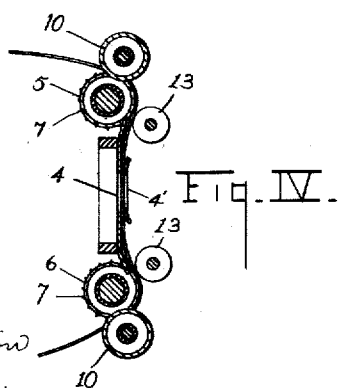
Fig. IV.
WITNESSES:
M. Louise Thurston
Leon Gilman
INVENTOR,
RALPH P. DEVAULT
BY Chappell Earl
ATTORNEYS.

R. P. DE VAULT.
MOTION PICTURE APPARATUS.
APPLICATION FILED AUG. 8, 1918.
1,347,326.
Patented July 20, 1920
3 SHEETS—SHEET 3.
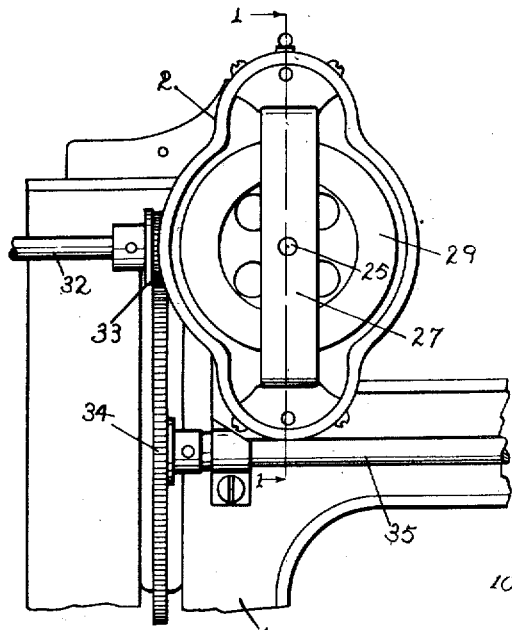
Fig. III.
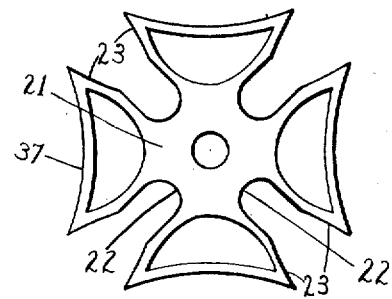
Fig. IX.
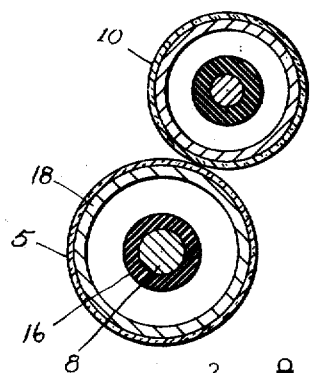
Fig. X.
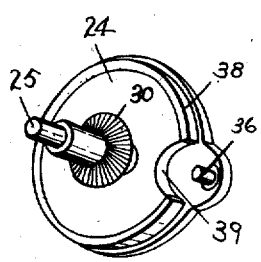
Fig. XI.
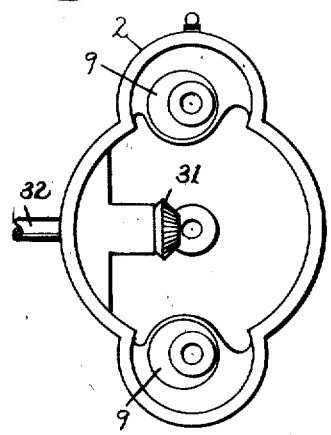
Fig. VI.
WITNESSES:
M. Louise Thurston
Lenn Gilman
INVENTOR.
RALPH P. DE VAULT
BY Chappell & Earl
ATTORNEYS.

UNITED STATES PATENT OFFICE.

RALPH P. DE VAULT, OF BATTLE CREEK, MICHIGAN.

MOTION-PICTURE APPARATUS.

1,347,326.      Specification of Letters Patent.      Patented July 20, 1920.

Application filed August 8, 1918. Serial No. 248,851.

*To all whom it may concern:*

Be it known that I, RALPH P. DE VAULT, a citizen of the United States, residing at Battle Creek, Michigan, have invented certain new and useful Improvements in Motion-Picture Apparatus, of which the following is a specification.

This invention relates to improvements in motion picture apparatus.

In moving picture apparatus of the intermittently moving film class it is customary to cut off the light during the movement of the film and this interruption of the light is the cause of the objectionable flicker. To reduce the flicker it is customary to provide the shutter with other interrupting portions causing further interruptions of the light while the film is at rest and while this reduces the pronounced flicker it also reduces the illumination on the screen, the average machine allowing about fifty per cent. of the light minus the density of the film to reach the screen.

The main objects of this invention are:

First, to provide in a motion picture apparatus an improved film driving means whereby the time of changing pictures is reduced, reducing the period of darkness so that it is practically imperceptible and therefore it is not necessary to introduce other periods of darkness or interruptions.

Second, to provide an improved motion picture apparatus utilizing a large percentage of the illumination.

Third, to provide in a motion picture apparatus an improved film driving means having these advantages which is very economical and durable in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail view mainly in vertical section on a line corresponding to line 1—1 of Figs. II, III and V.

Fig. II is a detail side elevation, parts being shown in dotted lines to better illustrate the manipulation thereof.

Fig. III is a detail view looking from the right of Fig. I with the cap or side plate of the gear box removed.

Fig. IV is a detail section through the film sprockets, feed and guide rollers on a line corresponding to line 4—4 of Fig. I.

Fig. V is a detail section on a line corresponding to line 5—5 of Fig. I.

Fig. VI is a detail view similar to that of Fig. V with parts removed.

Fig. VII is a detail section on a line corresponding to line 7—7 of Fig. VIII showing details of the feed and guide roller supports.

Fig. VIII is a detail section on a line corresponding to line 8—8 of Fig. VII.

Fig. IX is a side view of one of the star gear wheels.

Fig. X is an enlarged detail section on a line corresponding to line 10—10 of Fig. I through one of the film sprockets and one of the feed rollers.

Fig. XI is a perspective view of the Geneva stop movement driving member.

Fig. XII is a perspective view of the film aperture gate.

Fig. XIII is a vertical section on a line corresponding to line 13—13 of Fig. XII.

In the drawing similar reference characters refer to similar parts throughout the several views, and the sectional views are taken looking in the direction of the little arrows at the ends of the section lines.

Referring to the drawing, 1 represents the frame of a moving picture machine, 2 the gear box or housing mounted thereon and 3 the lens box or casing. Details of the shutter are not illustrated as they form no part of this invention.

The film aperture gate 4 is arranged at the rear of the lens box. The film casing and support are not illustrated as such parts form no part of this invention.

I provide a pair of film sprockets 5 and 6, the sprocket 5 being disposed above and the sprocket 6 being disposed below the aperture gate or framing device 4. These sprockets have teeth 7 to engage perforations in the films of well-known type. The spindles 8 for the film sprockets are carried by the bearings 9 mounted on the gear box 2.

I provide film pressure rollers 10 which coact with the film sprockets. The rollers 10 are mounted so as to coact with the film rollers at the outer sides thereof. These rollers are mounted on swinging arms 11 pivoted at 12. Guide rollers 13 are also mounted on these swinging arms to engage the film as it passes from the sprocket 5 and to the sprocket 6 guiding it to the aperture gate, as shown in Fig. IV, and also holding the film to the film sprockets so that there is substantial peripherical contact of the film with the sprockets insuring the simultaneous engagement of several of the pins of each roller with the film apertures. The printing device or gate is provided with a plate 4' under which the film passes. This plate is spaced from the gate so as to allow a free movement of the film without any braking or gripping action thereon and prevents fluttering of the film. Between the guide rollers the film is free from braking friction, it being a rather common expedient to prevent overthrow of the film by braking friction at this point.

Springs 14 hold the rollers 10 yieldingly downward, adjustable stops 15 being provided for the rollers. The film sprockets are preferably made up of a spool 16 of hard rubber fitted upon the spindle and secured thereon by the screw 17, a barrel 18 of aluminum having film engaging teeth, and a facing or covering 19 of suitable fabric. The pressure rollers 10 are similarly constructed having peripheral grooves 20 therein to accommodate the teeth of the sprockets. This construction is of advantage in that the rollers are light and at the same time sufficiently strong for the purpose.

The spindles are provided with driven Geneva gears or star wheels 21 having radial slots 22 therein having outwardly diverging surfaces 23 at the entrance thereof. The driving member 24 of the Geneva movement is mounted on the shaft 25 carried by the bearing 26 at the inner side of the housing and by a bridge 27 at the outer side of the housing, the outer side of the housing being closed by the cap plate 28. A balance wheel 29 is secured to this driving shaft 25.

The shaft of the driving member is provided with a beveled gear 30 with which a gear 31 on the shaft 32 meshes. This shaft 32 is provided with a pinion 33 meshing with the large gear 34 on the power shaft 35, crank or other means being provided for driving the shaft 35.

The Geneva movement 24 is disposed between the star gears 21 and is provided with oppositely disposed and oppositely projecting pins 36 coacting therewith. The star wheels have concave surfaces 37 between the slots thereof with which the locking cams 38 coact. The cams have recesses 39 opposite the pins permitting the turning of the star wheels. The diverging surfaces 23 of the slots permit the pins to enter well into the slots before coming into operative engagement with the star wheels, that is, they pass well toward the axes thereof as indicated by dotted lines in Fig. V. This shortens the period of actuation of the star wheels so that the time of shifting or actuation of the film is materially reduced. The time of actuation in the structure illustrated is about one-twelfth of the time of complete rotation of the driving member. I thus reduce the period of operation to such an extent that the period of darkness or interruption is such as to be unobjectionable and therefore it is not necessary to provide for or introduce other periods of darkness or interruption while the film is at rest. This greatly increases the efficiency of the light and I have succeeded in utilizing about ninety per cent., which result is greatly in excess of what has been heretofore accomplished.

I am able to eliminate the friction usually provided to check the film where a single sprocket feed is provided and thus relieve the film of the strains of the extra speed in the intermittent feed. I accomplish these objects in a very simple and effective manner and secure the increased speed without increasing the speed of the driving member.

I have illustrated and described my improvements in an embodiment which I have found very satisfactory and practical. I have not attempted to illustrate or describe certain modifications or adaptations which I contemplate as I believe the disclosure made will enable those skilled in the art to which my invention relates to embody or adapt the same as may be desired.

Having thus described my invention, what I claim as new and desire to secure by Letters Patent, is:

1. In a motion picture apparatus of the class comprising an intermittently driven film and an aperture gate, the combination of a pair of film sprockets disposed one at each side of the gate, feed rollers disposed at the outer sides of the film sprockets to hold the films thereto, guide rollers disposed to engage the film as it passes from the first sprocket and to the second whereby the film is held to the film sprockets and guided to the gate, the film being free from braking friction between said film sprockets, spindles for said film sprockets, star wheels on said spindles provided with slots having outwardly diverging surfaces at the entrance thereof and concave locking surfaces between the slots, and a driving wheel disposed between said star wheels and provided with a pair of oppositely disposed and oppositely projecting pins coacting with said star wheel slots and with recessed cylindrical locking cams on the sides thereof, arranged so that the pins travel over the diverging said surfaces of the slots while the locking cams are in locking engagement with the star wheels.

2. In a motion picture apparatus of the class comprising an intermittently driven film and an aperture gate, the combination of a pair of film sprockets disposed one at each side of the gate, spindles for said film sprockets, star wheels on said spindles provided with slots having outwardy diverging surfaces at the entrance thereof and concave locking surfaces between the slots, and a driving wheel disposed between said star wheels and provided with a pair of oppositely disposed and oppositely projecting pins coacting with said star wheel slots and with recessed cylindrical locking cams on the sides thereof arranged so that the pins travel over the diverging said surfaces of the slots while the locking cams are in locking engagement with the star wheels.

3. In a structure of the class described, the combination of a pair of film sprockets, driven star wheels therefor provided with slots having outwardly diverging surfaces at the entrance thereof and concave locking surfaces between the slots, and a driving wheel disposed between said star wheels and provided with a pair of oppositely disposed and oppositely projecting pins coacting with said star wheel slots and with recessed cylindrical locking cams on the sides thereof arranged so that the pins travel over the diverging said surfaces of the slots while the locking cams are in locking engagement with the star wheels.

4. In a structure of the class described, the combination of a film sprocket, a driven wheel therefor provided with slots having outwardly diverging surfaces at the entrance thereof and concave locking surfaces between the slots, and a driving wheel provided with a pin coacting with said star wheel slots arranged so that the pin travels over the diverging surfaces of the slots while the locking cam is in locking engagement with the star wheel.

In witness whereof, I have hereunto set my hand and seal in the presence of two witnesses.

RALPH P. DE VAULT. [L. S.]

Witnesses:
L. C. PARSHALL,
E. LUCILE PARSHALL.